3,369,876
EXTRACTION OF Cu, U, Co OR Fe WITH CERTAIN AMINO SULFIDE COMPOUNDS
Robert A. Grimm, Bloomington, Minn., assignor to Ashland Oil & Refining Company, Ashland, Ky., a corporation of Kentucky
No Drawing. Filed June 1, 1965, Ser. No. 460,470
10 Claims. (Cl. 23—340)

This invention relates to a process for extracting metal values from aqueous solutions, and more particularly it relates to a process for extracting metal values from acqueous solutions thereof by the use of certain aminosulfide compounds.

It is well known that metal values may be extracted from solutions by the use of certain amines as complexing agents. There are, however, many disadvantages which result from using such amines in the extraction of metal values. Among these disadvantages are (1) the metalamine complex has only a limited solubility in the organic liquid extracting medium; (2) the complex which is produced is a reasonably stable material, thus making it difficult to break the complex in the recovery of the desired metal values; and (3) the amines which are used frequently cause the organic liquid to emulsify in the aqueous solution containing the metal values. The use of the aminosulfide compounds of this invention as extraction agents has substantially eliminated these disadvantages.

It is an object of this invention to provide an improved process for extracting metal values from aqueous solutions thereof. It is another object of this invention to provide an improved process for extracting metal values from aqueous solutions thereof by the use of certain aminosulfide compounds as extracting agents. It is still another object of this invention to provide an improved process for extracting metal values from aqueous solutions thereof by the formation of complexes which are easily dissociated and which thereby facilitate the recovery of the desired metal values. Still other objects will be apparent from the more detailed description of this invention which follows.

The foregoing objects are accomplished by providing a process in which an aqueous solution of metal values at a pH of about 2–5 is intimately mixed with an organic hydrocarbon solution of an extracting agent having the general formula:

$$XR_1—Y—R_2X$$

where Y is a radical selected from the group consisting of sulfide and disulfide, $XR_1$— and —$R_2X$ are organic radicals having at least four carbon atoms and are selected from the group consisting of X-substituted-alkyl, -alkenyl, -alkanoate and -alkenoate in which X is a radical selected from the group consisting of —$NH_2$, —$NHRNH_2$, and —NHROH where R is an alkylene radical having 2–3 carbon atoms, and separating the resulting mixture into an aqueous layer substantially free of said metal values and an organic layer containing substantially all of said metal values.

In the preferred embodiment of this invention, an aqueous solution of cupric sulfate at a pH of about 2 is mixed with a solution comprising a liquid petroleum hydrocarbon containing about 5 percent by weight of a polar organic solvent and about 5 percent by weight of a bis-(alkylaminostearate) sulfide. This mixture is vigorously agitated and permitted to separate into two layers; a lower aqueous layer, and an upper organic layer having a bluish or greenish color. After separation of the two layers, the colored layer is treated by adjusting the pH to about 1 or, alternatively, by bubbling ammonia through the layer, causing the copper to precipitate in the form of a complex which can be easily dissociated to recover the copper salt and the ammonia.

The compounds used as extracting agents according to this invention have been described in some detail in copending application Ser. No. 458,477, filed May 24, 1965, now abandoned. These compounds are produced by a two-step process in which a long chain acyclic monoolefin or a monoester or polyester of an unsaturated carboxylic acid, preferably monounsaturated, is reacted with sulfur monochloride or sulfur dichloride in the first step to produce an intermediate product. These olefins and esters have 6 to 60 carbon atoms per molecule. The preferred olefins have 8 to 26 carbon atoms per molecule and the preferred esters are monoesters of monounsaturated fatty acids having 12 to 26 carbon atoms per molecule. In the second step, the intermediate product is reacted with ammonia or an amine to produce the final product. Except when cyclization occurs, these products are diadducts resulting from joining two carbon compounds through a sulfide bridge and adding an amino group to the carbon atom adjacent to the bridge on each of the two hydrocarbon groups. When each of the original unsaturated carbon compounds is ethyl oleate the final product will comprise two molecules of ethyl stearate joined at their 9- or 10-positions through a sulfide or disulfide bridge, and having an amine group on the adjacent carbon atoms, i.e., at the 10- or 9-positions, respectively. Thus it may be seen that many varieties of compounds are contemplated depending upon (1) the nature of the original unsaturated carbon compound, (2) the choice of the bridge as a monosulfide or a disulfide. and (3) the nature of the amino group attached to each of the two carbon chains.

Among the specific compounds which are contemplated as extraction agents in the process of this invention are the bis-(aminoalkanoate) sulfides, such as
bis-9(10)-(ethyl-10(9)-aminostearate) sulfide,
bis-9(10)-(methyl-10(9)-aminopalmitate) sulfide, and
bis-13(14)-(butyl-14(13)-aminobehenate) sulfide;
the bis(aminoalkenoate) sulfides, such as
bis-(9(10)-(ethyl-10)(9)-octadec-17-enoate) sulfide;
the bis-(aminoalkyl) sulfides such as
bis-1(2)-(2(1)-aminododecane) sulfide, and
bis-1(2)-(2(1)-aminoeicosane) sulfide; and
the bis-aminoalkenyl) sulfides, such as
bis-1(2)-(2(1)-amino-9-decene) sulfide; and
bis-1(2)-(2(1)-amino-17-octadecene) sulfide.

It is to be understood also that the scope of this invention includes the foregoing compounds which are altered by one or more substitutions in which the amino group is replaced by a group such as aminoethyleneamino, aminopropyleneamino, hydroxyethyleneamino, and hydroxypropyleneamino, and the sulfide is replaced by disulfide. Examples of such alternate compounds are bis-9(10)-(ethyl-10(9)-aminoethyleneaminostearate) sulfide,
bis-9(10)-(ethyl-10(9)-hydroxyethyleneaminostearate) sulfide, and
bis-9(10)-(ethyl-10(9)-aminopropyleneaminostearate) disulfide.

In the case of the bis-(aminoalkyl) sulfides or disulfides and the bis-(aminoalkenyl) sulfides or disulfides cyclization frequently occurs in the preparation of these compounds, thus producing an extraction agent which is a mixture of acyclic and cyclic materials.

This cyclization phenomenon occurs most frequently when the extraction agent is made from alpha-olefin starting materials. For example, if 1-dodecene is treated with sulfur dichloride and the intermediate product is thereafter treated with ammonia, the acyclic product is bis-1(2)-(2(1)-aminododecane) sulfide, while the cyclic product is 3,5-di-n-decylthiomorpholine. It may be seen that the cyclization occurs by eliminating one amino group and forming a ring from the sulfur bridge, the remaining amino group, and the adjacent hydrocarbon portions. It is to be understood that whenever, in the description of this invention and in the appended claims, a bis-(aminoalkyl) sulfide, a bis-(aminoalkenyl) sulfide, or the disulfide of either is mentioned, it is intended that the corresponding cyclic structure may also be present.

One of the surprising features of this invention is that some compounds which are somewhat structurally related to the extraction agents of this invention either do not function at all as extraction agents, or do not function as extraction agents under the advantageous pH extraction conditions of this invention. When the amine group is an n-alkyl secondary or tertiary amine group or is an aromatic amine group, the resulting compound does not exhibit any capability of functioning as an agent for the extraction of metal values from aqueous solutions. Thus, among the compounds which are inoperable are the bis-9(10)-(10(9)-ethylaminostearate) sulfides, the bis-9(10)-(10(9)-dibutylaminostearate) sulfides, and the bis-9(10)-(10(9)-anilinostearate) sulfides. Furthermore, it has been found that when the amino group is derived from a diamine, the diamine must be either ethylene diamine or propylene diamine, or the resulting product will not function satisfactorily as an extraction agent at the desirable pH extraction conditions of this invention. Thus, bis-9(10)-(10(9)-aminoethyleneaminostearate) sulfides are good extraction agents while bis-9(10-(10(9)-aminotetramethyleneaminostearate) sulfides do not function as extraction agents at the desirable pH extraction conditions of this invention.

The composition of the aqueous solution containing soluble values is important in determining the effectiveness of the process of this invention. Not only will the solution normally contain the metal cation, but it will also contain an anion derived from the metal salt forming the aqueous solution. Although many different metal values can be extracted from aqueous solutions by the process of this invention the process has been found especially applicable in the extraction of copper values where the copper is present in its cupric or Cu(II) oxidation state; in aqueous solutions the copper values are hydrated and probably exist in the form of the complex $[Cu(H_2O)_6]^{++}$. Other metal values which can be extracted in certain embodiments of this invention are cobalt values where the cobalt is present as Co(II), uranium values where the uranium is present as U(VI), and iron values where the iron is present as Fe(II) or Fe(III).

The anions which are present in the aqueous solution may enhance or inhibit the extraction process. Tests have shown that in the case of copper the extraction efficiency of the process decreases in the following order: chloride, sulphate, nitrate, and perchlorate. Since in commercial copper mining the copper values are found as aqueous solutions of cupric sulfate, it is the preferred embodiment of this invention to extract copper values from such aqueous solutions of cupric sulfate. Although this order of preference applies to certain other cations, it does not apply universally; for example, cobaltous nitrate is more efficiently extracted in the process of this invention than is cobaltous sulfate, and similarly uranyl acetate is more efficiently extracted in the process of this invention than is uranyl sulfate.

An optional component of the process of this invention is a solubility assistant. The extraction agent performs its function by forming a water-insoluble complex with the metal values which are being extracted. Frequently the resulting complex is not completely soluble in the organic layer and it forms an intermediate layer between the aqueous layer and the organic layer. In order to make this complex soluble in the organic layer and thereby make it easier to recover the metal values, it has been found that the presence of a solubility assistant is frequently desirable. The materials which function as solubility assistants are hydrocarbon-soluble, polar materials. Typical materials which can fulfill this function are the intermediate alcohols, i.e., those having 6 to 14 carbon atoms, the lower alkyl esters, such as ethyl acetate, and the ethers, such as diethyl ether. The amount of solubility assistant which is employed in the process of this invention normally falls within the range of about 1% to about 5% by weight of the organic liquid phase of this process.

The only process condition which has any bearing on this invention is the pH of the aqueous solution containing the metal values to be extracted. It has been found that if this pH is less than 2 or greater than 5, substantially no extraction occurs, and accordingly, this is a limitation on the process of this invention. The pH can be adjusted by adding acids or bases which do not react with the other chemical compounds present, or otherwise interfere with the process of this invention. For the most part, mineral acids such as sulfuric acid or hydrochloric acid are suitable for lowering the pH, and bases such as sodium hydroxide and ammonium hydroxide are preferred when an alkaline adjustment is required.

In order to recover the metal values from the organic phase, a stripping action must take place which will regenerate the organic phase for further extraction, and will produce metal values as the desired end-product. While the stripping step may take on several alternate forms, four are mentioned as preferred procedures. If sufficient acid is added to the system after extraction to reduce the pH to about 1, the metal salt is extracted into the aqueous phase. The extraction agent can then be regenerated by contacting the organic phase with a base such as ammonia, sodium hydroxide, sodium carbonate or sodium bicarbonate.

A second procedure is to separate the organic layer containing the complexed metal values and to treat that layer with a small portion of aqueous ammonia, which causes the metal values to migrate to the aqueous ammonia layer. In a third procedure, a base such as sodium hydroxide is added, causing the metal value to precipitate and at the same time regenerating the extraction agent for reuse. In a fourth procedure when copper is the extracted metal, gaseous ammonia can be bubbled through the organic phase causing the copper-ammonia complex to precipitate and simultaneously regenerating the active organic phase or the extracting agent. In certain embodiments of this invention other well known chemical reactions may be preferred which will cause precipitation of the extracted metal.

The concentration of the extraction agent in the process of this invention should be about 5% by weight of the organic phase. This concentration can vary from about 1% to about 10% without causing any more serious problems than the handling of large amounts of dilute solutions or small amounts of highly concentrated solutions. A more meaningful concentration, directly relating to the efficiency of the process, is one in which amount of extraction agent is a function of the amount of metal values to be extracted. If the molar ratio of extraction agent introduced to the organic phase to metal in the aqueous phase is about 2:1, a maximum extraction efficiency is reached. At molar ratios of about 1:1 very little extraction is achieved, while at molar concentrations of as high as 5:1, the extraction efficiency is about the same as that experienced when the ratio was 2:1. Accordingly, in the broadest operable sense, the molar ratio of extraction agent to metal should be at least about 2:1.

Although the foregoing description has centered around the removal of a single metal value from an aqueous solution of that metal value, it should be understood that this invention is not limited in that respect. The aqueous solution from which metal values are to be extracted can contain more than one variety of metal value, and the process of this invention can be employed to extract one or more of those metal values. For example, an extraction agent of this invention can complex with copper values and with iron values in the same solution and thereby permit the simultaneous recovery of both metal values. Also, from an aqueous solution containing cobalt and nickel values, the process of this invention will selectively recover the cobalt values but not the nickel values. It may be seen therefore that from a mixture of several types of metal values, some can be recovered while others are left untouched by this process.

The following examples illustrate certain embodiments of this invention. Parts and percentages are by weight unless otherwise specified. The concentration of metal ions in the colored organic solution is directly proportional to the light absorbance characteristics of the solution. The concentration determined by measuring, spectrophotometrically, the amount of light absorbed by the tested solution, employing an incident light having a wave length of 660 millimicrons.

Example 1

A series of identical aqueous solutions of 0.03 molar copper sulfate were prepared employing various amounts of sulfuric acid to adjust the pH to the values shown in the following tabulation. These solutions contained the copper ions which were to be extracted by the process of this invention. Organic solutions were prepared having the same volumes as the aqueous solutions, and comprising a petroleum hydrocarbon (Solvesso 150) containing 5% by weight of isodecyl alcohol, and 0.06 molar concentration of bis-9(10)-(ethyl-10(9)-aminostearate) sulfide. In each test an aqueous solution was mixed with an organic solution and shaken vigorously to accomplish the extraction, and the resulting mixture was permitted to separate into an upper organic layer which was bright blue in color and a lower, colorless, aqueous layer. The blue organic layer was then tested to determine how much incident light at a wave length at 660 millimicrons would be absorbed passing through that solution. The following results were obtained:

| pH of aqueous solution: | Absorbance |
|---|---|
| 1.0 | 0.01 |
| 1.2 | 0.03 |
| 1.4 | 0.65 |
| 1.6 | 3.8 |
| 1.8 | 5.1 |
| 2.0 | 5.7 |
| 3.0 | 5.7 |
| 4.0 | 5.8 |
| 5.0 | 5.7 |

An absorbance of about 5.7 represents essentially complete extraction of all copper ions from the aqueous phase. It is apparent that at a pH of about 1 a negligible amount of copper was extracted and that at a pH of about 2 substantially all of the copper was extracted and further that as the pH was raised to 3, 4, and 5, respectively, no change in the extraction efficiency was found.

Example 2

In a manner similar to that described with respect to Example 1, a series of aqueous solutions and organic solutions were prepared for test purposes. In each instance the initial pH of the aqueous solution was 1.7 and other conditions were the same as those specified in Example 1 with the single exception that the concentration of the extraction agent in the organic solution was varied to determine the effect of a change in the molar ratio of extraction agent: copper. The following results were obtained:

| Concentration of Extraction Agent in Organic Solution (grams/liter) | Molar Extraction Agent: Copper | Absorbance |
|---|---|---|
| 10.8 | 0.5 | 0.01 |
| 21.6 | 1 | 0.02 |
| 43.2 | 2 | 5.6 |
| 64.7 | 3 | 5.9 |
| 86.3 | 4 | 6.0 |
| 107.9 | 5 | 5.8 |

These experiments show that at a molar ratio of less than about 2:1 substantially no extraction occurred and that at molar ratios above 2:1 substantially no further improvement in efficiency was obtained.

Example 3

The experimentation of Example 2 was repeated employing aqueous solutions with a pH of 2 and varying the amounts of copper and of extraction agent. The total molar concentration of copper plus extraction agent was maintained at a constant value of 0.032 molar but the mole fraction of extraction agent was varied as shown. The following results were obtained:

| Mole fraction (extraction agent) (extraction agent and copper): | Absorbance |
|---|---|
| 0.0 | 0.00 |
| 0.25 | 0.53 |
| 0.33 | 0.89 |
| 0.50 | 1.90 |
| 0.66 | 2.38 |
| 0.75 | 1.90 |
| 1.0 | 0.01 |

These experiments again confirm that a ratio of 2 moles of extraction agent per mole of copper (mole fraction=0.66) the maximum amount of extraction is obtained.

Example 4

The experimentation of Example 2 was repeated employing a different extraction agent and employing a pH of 2.4 in the aqueous solution. The extraction agent in this example was similar to that of Example 1, except that it was made from the ethyl esters of tallow acids rather than from pure ethyl oleate. The tallow acids used were those of the product sold under the tradename "Neofat 65" and contained a mixture of myristic acid, palmitic acid, stearic acid, palmitoleic acid, and oleic acid. The extraction agent obtained by using the esters of this starting material was calculated to contain about 45% of active materials and about 55% of inert materials, the latter being derived from esters of saturated acids which could not react to produce the aminosulfide extraction agent of this invention. The following results were obtained:

| Concentration of Extraction Agent (grams/liter) | Mole Ratio Active Extraction Agent: Copper | Absorbance |
|---|---|---|
| 5.4 | 0.13 | 0.23 |
| 12.0 | 0.25 | 0.58 |
| 24.0 | 0.50 | 1.28 |
| 48.0 | 1.00 | 1.73 |
| 72.0 | 1.50 | 3.05 |
| 96.0 | 2.00 | 3.50 |
| 120.0 | 2.50 | 3.50 |

This example again confirmed the previous results indicating that the optimum in extraction efficiency occurred at a molar ratio of about 2:1.

*Example 5*

An aqueous solution was prepared containing 0.03 molar concentration of cupric sulfate at a pH of 2. An organic solution was prepared comprising a petroleum hydrocarbon fraction (Solvesso) and 5% by weight of isodecyl alcohol, and containing 0.06 molar concentration of the extraction agent of Example 1. Equal volumes of the aqueous solution and the organic solution were mixed and shaken vigorously and then permitted to stand with the result that the mixture separated into two phases: the upper organic phase having a bright blue color, and the lower aqueous phase being colorless. After separating the two layers, the aqueous raffinate was made basic with sodium hydroxide and treated with sodium sulfide to determine whether any Cu(II) ion was present. This aqueous raffinate remained perfectly colorless, indicating the absence of Cu(II) ion. Gaseous ammonia was bubbled through the blue organic layer for a few moments, and after it was shaken to coagulate the dark blue solid complex which formed, the mixture was filtered, producing a colorless organic filtrate. This filtrate was immediately reused to extract a similar portion of the original aqueous solution, indicating the steps employed in a continuous process.

*Example 6*

An aqueous solution was prepared containing 0.0315 molar concentration of cupric sulfate at a pH of 2. An organic solution was prepared comprising 0.25 gram of bis-9(10)-(ethyl-10(9)-hydroxyethyleneaminostearate) sulfide per 10 ml. of a 75/25 mixture of Skelly B petroleum fraction and ethyl acetate. Equal volumes of the aqueous solution and of the organic solution were mixed, shaken, and left to separate. A good phase separation occurred with the organic layer exhibiting first a blue color and then a green color, due to the presence of a copper complex in that layer. The blue-green color disappeared when concentrated hydrochloric acid was added to a portion of the two-phase mixture, thus providing one method for recovering the copper. When a portion of the blue-green organic layer was shaken with aqueous ammonia, the organic portion became colorless and the small aqueous portion (derived from the added aqueous ammonia) became bluish, thus providing an alternative method of recovering the copper. When another portion of the blue-green organic layer was treated by bubbling gaseous ammonia through the layer, a bluish precipitate formed and the organic layer became colorless, thus providing still another alternative method for recovering the copper. In both of the last two alternative methods, the ligand of the complex is automatically regenerated by that method and is ready for reuse.

The foregoing examples are intended to be illustrative and not to be restrictive. The scope of this invention is intended to be as broad as the entire description which precedes and to be limited in no sense other than that found in the appended claims.

What is claimed is:

1. The process for extracting metal values from an aqueous solution thereof which comprises adjusting to a value of 2–5 the pH of an aqueous solution containing soluble metal values selected from the group consisting of copper, uranium, cobalt, and iron; intimately mixing the resulting aqueous solution with a hydrocarbon solution of an extraction agent having the formula:

$$XR_1\text{—}Y\text{—}R_2X$$

wherein Y is a radical selected from the group consisting of sulfide and disulfide, and $XR_1\text{—}$ and $\text{—}R_2X$ are organic radicals having at least 4 carbon atoms and are selected from the group consisting of X-substituted-alkyl, -alkenyl, -alkanoate and -alkenoate in which X is a radical selected from the group consisting of $\text{—}NH_2$, $\text{—}NHRNH_2$, and $\text{—}NHROH$ where R is an alkylene radical of 2–3 carbon atoms; separating the resulting mixture into an aqueous layer substantially free of said metal values and an organic layer containing substantially all of said metal values.

2. The process of claim 1 in which the molar ratio of said extraction agent to said metal values is at least 2:1.

3. The process of extracting copper values from an aqueous solution of cupric sulfate, which comprises adjusting the pH of an aqueous solution of cupric sulfate to 2; intimately mixing that aqueous solution with a hydrocarbon solution of an extraction agent having the formula:

$$XR_1\text{—}Y\text{—}R_2X$$

wherein Y is a radical selected from the group consisting of sulfide and disulfide, and $XR_1\text{—}$ and $\text{—}R_2X$ are organic radicals having at least 4 carbon atoms and are selected from the group consisting of X-substituted-alkyl, -alkenyl, -alkanoate and -alkenoate in which X is a radical selected from the group consisting of $\text{—}NH_2$, $\text{—}NHRNH_2$, and $\text{—}NHROH$ where R is an alkylene radical of 2–3 carbon atoms; the molar ratio of said extraction agent to the copper in said cupric sulfate being at least about 2:1; separating the resulting mixture into an aqueous layer substantially free of copper values and a hydrocarbon layer containing substantially all of said copper values.

4. The process of claim 3 in which said extraction agent is a bis-(aminoalkanoate) sulfide.

5. The process of claim 3 in which said extraction agent is a bis-(aminoalkyl) sulfide.

6. The process of claim 3 in which said extraction agent is bis-9(10)-(ethyl-10(9)-aminostearate) sulfide.

7. The process of claim 3 in which said extraction agent is bis-9(10)-(ethyl-10(9)-hydroxyethyleneaminostearate) sulfide.

8. The process of extracting copper values from an aqueous solution of cupric sulfate which comprises adjusting the pH of an aqueous solution of cupric sulfate to 2, intimately mixing that aqueous solution with a hydrocarbon solution containing 1%–5% by weight of a hydrocarbon-soluble, polar, organic solvent, and 1%–10% by weight of an extraction agent having the formula:

$$XR_1\text{—}Y\text{—}R_2X$$

wherein Y is a radical selected from the group consisting of sulfide and disulfide, and $XR_1\text{—}$ and $\text{—}R_2X$ are organic radicals having at least 4 carbon atoms and are selected from the group consisting of X-substituted-alkyl, -alkenyl, -alkanoate and -alkenoate in which X is a radical selected from the group consisting of $\text{—}NH_2$, $\text{—}NHRNH_2$, and $\text{—}NHROH$ where R is an alkylene radical of 2–3 carbon atoms; the molar ratio of said extraction agent to the copper in said cupric sulfate being at least about 2:1; separating the resulting mixture into an aqueous layer substantially free of copper values and a hydrocarbon layer containing substantially all of said copper values and recovering said copper from said hydrocarbon layer.

9. The process of claim 8 in which the said recovery of copper values from the hydrocarbon layer is accomplished by bubbling gaseous ammonia through said layer and filtering out the resulting precipitate containing copper values.

10. The process of claim 3 in which the said recovery of copper values from the hydrocarbon layer is accomplished by contacting the hydrocarbon layer and with an aqueous solution having a pH of up to 1.

(References on following page)

References Cited

UNITED STATES PATENTS 2,899,451  8/1959  Neville _____ 23—340

OTHER REFERENCES

Dwyer et al.: Chelating Agents and Metal Chelates, Academic Press, New York, 1964, pp. 125 to 129.

L. DEWAYNE RUTLEDGE, *Primary Examiner.*

CARL D. QUARFORTH, *Examiner.*

L. A. SEBASTIAN, *Assistant Examiner.*

UNITED STATES PATENT OFFICE
CERTIFICATE OF CORRECTION

Patent No. 3,369,876                      February 20, 1968

Robert A. Grimm

It is certified that error appears in the above identified patent and that said Letters Patent are hereby corrected as shown below:

Column 8, line 71, the claim reference numeral "3" should read -- 8 --.

Signed and sealed this 13th day of January 1970.

(SEAL)
Attest:

Edward M. Fletcher, Jr.                   WILLIAM E. SCHUYLER, JR.
Attesting Officer                            Commissioner of Patents